United States Patent
Ojanperä

(10) Patent No.: US 9,332,346 B2
(45) Date of Patent: May 3, 2016

(54) PROCESSING OF MULTI-DEVICE AUDIO CAPTURE

(75) Inventor: Juha Petteri Ojanperä, Nokia (FI)

(73) Assignee: Nokia Technologies Oy, Espoo (FI)

( * ) Notice: Subject to any disclaimer, the term of this patent is extended or adjusted under 35 U.S.C. 154(b) by 648 days.

(21) Appl. No.: 13/579,024

(22) PCT Filed: Feb. 17, 2010

(86) PCT No.: PCT/IB2010/050704
§ 371 (c)(1),
(2), (4) Date: Aug. 14, 2012

(87) PCT Pub. No.: WO2011/101708
PCT Pub. Date: Aug. 25, 2011

(65) Prior Publication Data
US 2012/0310396 A1  Dec. 6, 2012

(51) Int. Cl.
*G06F 17/00* (2006.01)
*H04R 3/00* (2006.01)
*H04R 1/40* (2006.01)
*G06F 3/16* (2006.01)

(52) U.S. Cl.
CPC ............... *H04R 3/005* (2013.01); *H04R 1/406* (2013.01); *G06F 3/16* (2013.01); *H04S 2400/15* (2013.01)

(58) Field of Classification Search
None
See application file for complete search history.

(56) References Cited

U.S. PATENT DOCUMENTS

| | | | |
|---|---|---|---|
| 2005/0094795 A1* | 5/2005 | Rambo | H04M 9/10 379/202.01 |
| 2005/0216258 A1 | 9/2005 | Kobayashi et al. | |
| 2005/0286728 A1* | 12/2005 | Grosvenor | H04R 5/027 381/91 |
| 2008/0232601 A1* | 9/2008 | Pulkki | H04S 7/302 381/1 |
| 2008/0247567 A1 | 10/2008 | Kjolerbakken et al. | |
| 2009/0094375 A1* | 4/2009 | Lection | G06F 15/16 709/231 |

FOREIGN PATENT DOCUMENTS

WO   WO-2009/109217 A1   9/2009

OTHER PUBLICATIONS

Carter, G. C., et al.; "*The smoothed coherence transform;*" Proceedings of the IEEE, vol. 61, No. 10; pp. 1497-1498; dated Oct. 1973; abstract retrieved on Nov. 7, 2013 from <http://ieeexplore.ieee.org/xpl/freeabs_all.jsp?arnumber=1451230&abstract=no&userType=inst>.

(Continued)

*Primary Examiner* — Fan Tsang
*Assistant Examiner* — David Siegel
(74) *Attorney, Agent, or Firm* — Alston & Bird LLP

(57) ABSTRACT

It is inter alia disclosed to select, by a first apparatus (21), one or more recording devices (20) to obtain a set of selected recording devices, or to receive, at the first apparatus (21), information on a set of one or more selected recording devices. The selected recording devices in the set of selected recording devices are selected from a set of recording devices at least based on relevance levels determined for the recording devices of the set of recording devices. A combination of audio signals recorded by the selected recording devices of the set of selected recording devices in an audio scene to obtain one or more combined audio signals for rendering is performed or caused by the first apparatus (21).

20 Claims, 8 Drawing Sheets

(56) References Cited

OTHER PUBLICATIONS

Chen, J., et al.; "*Performance of GCC-and AMDF-Based Time-Delay estimation in Practical Reverberant Environments*;" EURASIP Journal on Applied Signal Processing, vol. 1; pp. 25-36; dated 2005; retrieved on Nov. 7, 2013 from <downloads.hindawi.com/journals/asp/2005/498964.pdf>.

Cusani, R.; "*Performance of fast time delay estimators*;" IEEE Transactions on Acoustics, Speech and Signal Processing, vol. 37, No. 5; pp. 757-759; dated May 1989; abstract retrieved on Nov. 7, 2013 from <http://ieeexplore.ieee.org/xpl/freeabs_all.jsp?arnumber=17568&abstractAccess=no&userType=inst>.

International Search Report and Written Opinion for Application No. PCT/IB2010/050704; dated Nov. 11, 2010.

Partial Supplementary European Search Report for corresponding European Application No. 10846025.4 dated Feb. 18, 2016, 7 pages.

* cited by examiner

PROCESSING OF MULTI-DEVICE AUDIO CAPTURE

RELATED APPLICATION

This application was originally filed as PCT Application No. PCT/IB2010/050704 filed Feb. 17, 2010.

FIELD

This invention relates to the field of audio capture, processing, representation, transport and rendering, in particular in the context of audio recordings provided by multiple devices.

BACKGROUND

An example of a use case of such audio capture, processing, representation, transport and rendering is multi-view audio. Multi-view audio is a concept that provides different aural views to an audio scene, from which a user can select the one he/she prefers. Taken alone, or also in combination with a corresponding multi-view video concept, multi-view audio enables a functionality that is considered an interesting feature in telepresence applications, audio/video conferencing, immersive person-to-person communication (possibly also including video and/or synthetic content, for instance to provide an "all-3D" experience), gaming, or virtual/augmented reality applications, to name but a few examples.

SUMMARY OF SOME EMBODIMENTS OF THE INVENTION

Capture of multi-view audio involves making use of a number of recording devices providing different aural views to the surrounding audio scene. A user (or an application) may be given a choice to listen to a specific one of these recordings according to his/her preference.

A user (or an application) may also be given a free choice of a desired listening position within an audio scene. In this approach, the audio signal associated with the desired listening position is determined as one or more combinations of recordings within the audio scene—each combination for instance based on one or more recordings for instance originating from recording devices close to the selected listening position.

However, due to limited capabilities for measuring and/or estimating positions of recording devices within an audio scene and/or due to inaccuracies of this position measurement and/or estimation, determining a suitable combination of recordings associated with a desired listening position within the audio scene may be compromised if relying solely on measured/estimated positions of recording devices.

Furthermore, there may exist situations where no dedicated measured/estimated positions of the respective recording devices are available at all, for instance if it is only generally known that a couple of recording devices are located in a specific area, such as a coverage area of a base station of a cellular communication system (e.g. a cell) or a coverage area of a Wireless Local Area Network (WLAN) access point or a coverage area of a beacon of a radio broadcasting system, to name but a few examples, for instance since the recording devices are able to receive radio signals from a base station/access point/beacon. The desired listening position then may for instance be known to be within this coverage area. Even further, there may exist situations where recordings from a couple of recording devices shall suitably be combined independent of a desired listening position.

In all of these use cases, combination of recordings from the multiple recording devices is aggravated if the number of recording devices is large, which may easily be the case for instance if audio is recorded at large events such as concerts or the like.

It is thus, inter alia, an object of the present invention to provide methods, apparatuses, systems, computer programs and computer program products for suitable combination of audio signals recorded by multiple recording devices.

In a first aspect of the present invention, a method is disclosed, comprising:
  one of selecting, by a first apparatus, one or more recording devices to obtain a set of selected recording devices and receiving, at the first apparatus, information on a set of one or more selected recording devices, the selected recording devices in the set of selected recording devices selected from a set of recording devices at least based on relevance levels determined for the recording devices of the set of recording devices, and
  one of performing, by the first apparatus, and causing, by the first apparatus, a combination of audio signals recorded by the selected recording devices of the set of selected recording devices in an audio scene, to obtain one or more combined audio signals for rendering.

In this first aspect of the present invention, furthermore a computer program is disclosed, comprising program code for performing the method according to the first aspect of the present invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

In this first aspect of the present invention, furthermore a computer-readable medium is disclosed, having a computer program according to the first aspect of the present invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

In this first aspect of the present invention, furthermore a first apparatus is disclosed, configured to perform the method according to the first aspect of the present invention.

In this first aspect of the present invention, furthermore a first apparatus is disclosed, comprising:
  means for one of selecting one or more recording devices to obtain a set of selected recording devices and receiving information on a set of one or more selected recording devices, the selected recording devices in the set of selected recording devices selected from a set of recording devices at least based on relevance levels determined for the recording devices of the set of recording devices, and
  means for one of performing and causing a combination of audio signals recorded by the selected recording devices of the set of selected recording devices in an audio scene, to obtain one or more combined audio signals for rendering.

In this first aspect of the present invention, furthermore a first apparatus is disclosed, comprising at least one processor; and at least one memory including computer program code, the at least one memory and the computer program code configured to, with the at least one processor, cause the first apparatus at least to:

one of select one or more recording devices to obtain a set of selected recording devices and receive information on a set of one or more selected recording devices, the selected recording devices in the set of selected recording devices selected from a set of recording devices at least based on relevance levels determined for the recording devices of the set of recording devices, and one of perform and cause a combination of audio signals recorded by the selected recording devices of the set of selected recording devices in an audio scene, to obtain one or more combined audio signals for rendering.

The computer program code included in the memory may for instance at least partially represent software and/or firmware for the processor. Non-limiting examples of the memory are a RAM or ROM that is accessible by the processor.

The first apparatuses according to the first aspect of the present invention may for instance be or be comprised in an electronic device, such as for instance a server, e.g. an audio server. The first apparatuses may for instance comprise a user interface and/or a network interface (for instance to interface with a communication network such as the Internet, a cellular communication system, and a WLAN, to name but a few non-limiting examples).

In the following, features and embodiments (exhibiting further features) of the first aspect of the present invention will be described, which are understood to equally apply to the method, apparatuses, computer program and computer program product of the first aspect of the present invention as described above. These single features/embodiments are considered to be exemplary and non-limiting, and to be respectively combinable independently from other disclosed features/embodiments with the first aspect of the present invention as described above. Nevertheless, these features/embodiments shall also be considered to be disclosed in all possible combinations with each other and with the first aspect of the present invention as described above.

If not otherwise stated, throughout this specification, if an apparatus/device is described to perform a certain action, the apparatus/device is understood to comprise according means for performing this action, the memory and computer program code of the apparatus are understood to be configured to, with the processor, cause the apparatus to perform this action (in addition to further actions already performed by the apparatus), and the computer program is considered to comprise according program code for performing this action when the computer program is executed on a processor.

The recording devices included in the set of recording devices, which comprises one or more (e.g. at least two) recording devices, are capable of recording audio signals. The recording devices may for instance be capable of recording one audio signal per recording device, but equally well, one or more recording devices of the one or more recording devices may be capable of recording more than one audio signal at a time, for instance from different directions. For recording the audio signals, the recording devices may for instance be equipped with one or more microphones. The recording devices or apparatuses connected (via a wireless or wirebound connection) to the recording devices may further be capable of providing the recorded audio signals to the first apparatus, either directly or via one or more further apparatuses. For instance, the recorded audio signals may be provided to the first apparatus under at least partial usage of a radio communications system.

The recording devices in the set of recording devices may for instance constitute a sub-set of a plurality of recording devices, wherein the plurality of recording devices may for instance comprise all recording devices from which audio signals recorded in an audio scene are or have been recorded. The set of recording devices may for instance only contain those recording devices of the plurality of recording devices that are close to a desired listening impression.

Setting out from the set of recording devices, a set of selected recording devices is determined by selecting recording devices from the set of recording devices. The selected recording devices are then included into the set of selected recording devices.

The selected recording devices are selected at least based on relevance levels determined for the recording devices of the set of recording devices. Therein, the relevance levels may for instance be determined so that each recording device is assigned a respective relevance level. The relevance levels assigned to recording devices may be mutually different, but equally well, the same relevance level may be assigned to two or more recording devices. The relevance levels are indicative of the relevance, for instance the perceptual relevance, of the recording devices, and thus serve as an aid in selecting recording devices from the set of recording devices. The relevance levels may for instance be determined for the recording devices of the set of recording devices at least based on audio signals recorded by the recording devices. The determining of the selected recording devices may further be based on a measured/estimated orientation of the recording devices.

Different (e.g. at least two different) sets of relevance levels may for instance be determined for the recording devices of the same set of recording devices. For instance, the different sets of relevance levels may be respectively determined for different frequency bands, for instance by applying different bandpass filters to audio signals recorded by the recording devices and forming an at least partial basis for the determining of the relevance levels. Such frequency-band-specific sets of relevance levels then may also yield frequency-band specific sets of selected recording devices and frequency-band-specific combined audio signals. This may contribute to an improved resolution of multiple audio sources/audio activity centres in an audio scene.

The set of selected recording devices is exploited by combining audio signals recorded by the selected recording devices of the set of selected recording devices in an audio scene to obtain one or more combined audio signals for rendering (e.g. for rendering by the first apparatus or by another apparatus). Therein, if the relevance levels for the recording devices are determined at least based on audio signals recorded by the recording devices, the recorded audio signals combined to obtain the one or more combined audio signals may be the same recorded audio signals based on which the relevance levels for the selected recording devices are determined, or may be different recorded audio signals.

The set of selected recording devices may be determined (by selecting the recording devices) before, during or after the selected recording devices have recorded the audio signals that are combined to obtain the one or more combined audio signals.

Therein, one or more audio signals may be recorded per selected recording device and may be involved in the combining. There may for instance be one or more selected recording devices with only one recorded audio signal and one or more selected recording devices with more than one (e.g. at least two) recorded audio signals. Combining the audio signals recorded by the selected recording devices may for instance be performed by downmixing the audio signals, for instance by stereo downmixing, to name but a non-limiting example. The combining may comprise further signal processing such as for instance filtering or panning. The combining may for instance produce a mono signal, stereo signals, binaural signals, or multi-channel audio signals, to name but a few non-limiting examples. Therein, only audio signals recorded by the selected recording devices of the set of selected recording devices are combined, i.e. audio signals recorded by other recording devices are excluded from the combination.

In this way, the one or more combined audio signals only contain audio signals recorded by the selected recording devices, rather than audio signals from all recording devices of the set of recording devices. Since the selected recording devices are selected based on relevance levels, the one or more combined audio signals then only contain audio signals recorded by recording devices that are considered relevant (based on the relevance levels) with respect to an audio scene, i.e. for instance represent the audio scene in the optimum way. This also reduces the complexity of generating the combined audio signals (since audio signals from less recording devices have to be processed). Furthermore, in case that the set of recording devices represents the recording devices that are considered to be close to a desired listening position, but if the measured/estimated positions of the recording devices are unreliable, considering only audio signals of recording devices that are considered relevant may contribute to exclude audio signals of recording devices that were erroneously included into the set of recording devices and thus may improve the quality of the combined audio signals. A suited relevance criterion for such a use case may for instance be a criterion that is based on the similarity of the audio signals recorded by the recording devices. This equally applies to situations where the position of the recording devices are not available at all or irrelevant, since then also a suitable reduction of the number of recording devices can be achieved by only including relevant recording devices into the set of selected recording devices based on the recorded audio signals of which the one or more combined audio signals are generated.

The first apparatus either performs the selecting of the recording devices itself (for instance based on information on a desired targeted listening impression), or receives information on the set of selected recording devices (e.g. from a user, an application, or from a further apparatus, to name but a few examples). The information may for instance be the set of selected recoding devices itself, or a representation thereof, for instance a coded representation. The information may also identify a selection of a set of selected recording devices from at least two at least partially different sets of selected recording devices.

Furthermore, the first apparatus either performs the combining of the audio signals recorded by the selected recording devices, or causes this combining (for instance by forwarding the set of selected recording devices to an apparatus that performs the combining).

The first apparatus may for instance be a server or a part thereof. The server may for instance be a multi-view audio server. The first apparatus may for instance further be capable of receiving the audio signals recorded by the recording devices of the set of recording devices. The first apparatus may for instance further be capable of determining the relevance levels.

According to a first embodiment of the first aspect of the present invention, the set of recording devices is derived from a plurality of recording devices at least under consideration of a position relationship between a desired listening position in the audio scene and measured/estimated positions of the recording devices. Therein, the forward slash "/" is considered to denote "and/or" throughout this specification. The plurality of recording devices may for instance comprise all recording devices from which recorded audio signals are or have been received, for instance with respect to a certain audio scene. The plurality of recording devices may for instance comprise those recording devices that are active and/or connected to an audio server. Deriving the set of recording devices from the plurality of recording devices based on their measured/estimated position with respect to a desired listening position constitutes a means for reducing the number of recording devices that contribute to the one or more combined audio signals.

In this first embodiment of the first aspect of the present invention, the deriving may for instance be performed by the first apparatus. Alternatively, the deriving may be performed by another apparatus, and the relevance levels may then be provided to the entity that selected the recording devices to obtain the set of selected recording devices.

In this first embodiment of the first aspect of the present invention, the desired listening position may for instance be provided by a second apparatus on which the one or more combined audio signals are to be rendered. The desired listening position may for instance be chosen by a user of the second apparatus (for instance based on a room plan or map presented to him) or an application executed by the second apparatus and then provided from the second apparatus to the first apparatus. Alternatively, the desired listening position may be pre-defined. Further alternatively, the desired listening position may be automatically determined, for instance based on the measured/estimated positions of the recording devices (for instance as their average).

In this first embodiment of the first aspect of the present invention, only recording devices with a measured/estimated position that is within a pre-defined area around the desired listening position may be included into the set of recording devices.

In this first embodiment of the first aspect of the present invention, only a pre-defined number of recording devices with a measured/estimated position that is within a pre-defined area around the desired listening position may be included into the set of recording devices. The recording devices included into the set of recording devices may for instance be the recording devices that have the closest measured/estimated positions with respect to the desired listening position.

According to a second embodiment of the first aspect of the present invention, the relevance levels of the recording devices are determined at least based on an analysis of a similarity between representations of audio signals recorded by the recording devices.

The similarity may for instance be determined by a similarity analysis function that may reveal similarities between audio signals (even if these audio signals are differently delayed), which may be considered as a measure of relevance for the recording devices that recorded them. For instance, recording devices that recorded audio signals that exhibit similarities with the recorded audio signals of many other recording devices may be assigned a high relevance. The set of selected recording devices then may for instance only comprise recording devices that recorded audio signals that are similar to each other, while excluding recording devices that recorded unsimilar audio signals. Similarity of recorded audio signals may for instance be considered to indicate that the recorded audio signals stem from the same audio source (or from a similar mix of audio sources). Combining only such similar recorded audio signals then may give a pure impression of the audio source (or the mix of audio sources) and may furthermore cancel the influence of unsimilar recorded audio signals (that may for instance stem from other, potentially distant audio sources).

The similarity analysis function may for instance at least partially be based on a cross-correlation between said representations. For instance, said similarity analysis function may be a cross-correlation function, or a weighted cross-correlation function, or a transformation of a cross-correlation function, or a combination of a cross-correlation function with another function (e.g. with a transformation of a cross-correlation function), to name but a few non-limiting examples. In all of these cross-correlation-based functions, either the representations of the recorded audio signals or modified versions (for instance hard-limited copies) thereof may be used. Equally well, the similarity analysis function may be based on an analysis of the difference between two representations for different shifts of the two representations with respect to each other, as for instance in case of an Average Magnitude Difference Function (AMDF). Equally well, the similarity analysis function may be based on combinations of cross-correlation-based functions and difference analysis functions.

According to a third embodiment of the first aspect of the present invention, the relevance levels of the recording devices are related to delays of representations of audio signals recorded by the recording devices with respect to a reference signal.

The representations of the audio signals may for instance be respective identical representations (e.g. respective replicas) of the recorded audio signals. Equally well, forming such a representation of one or more audio signals recorded by a recording device may comprise filtering, decimating, combining (e.g. averaging) or otherwise processing these one or more audio signals. For instance, the audio signals may be band-pass-filtered, for instance to improve the resolution of multiple audio sources/audio activity centres in the audio scene. There may for instance be one respective representation per recording device.

In this third embodiment of the first aspect of the present invention, the delays may for instance be determined based on a similarity analysis function applied to the representations of the audio signals recorded by the recording devices with respect to the reference signal. The delay may for instance be determined as that shift between a representation and the reference signal that yields an extreme (e.g. a maximum or minimum) value of the cross-correlation-based function (e.g. a maximum cross-correlation value or a minimum difference value). There may for instance be one respective representation per recording device, and one respective delay per representation/recording device. In the similarity analysis function (e.g. the cross-correlation function or the difference function), one or more segments of each representation of the audio signals may be considered. This may contribute to improve the similarity analysis results.

In this third embodiment of the first aspect of the present invention, the reference signal may for instance be a representation of the one or more audio signals recorded by one of the recording devices of the set of recording devices. The reference signal may for instance be the representation (of the audio signals recorded by a recording device) that has the largest similarity with respect to all other representations (of audio signals recorded by the other recording devices).

In this third embodiment of the first aspect of the present invention, the reference signal may be identified and the delays may be obtained as results from an at least partially joint process.

In this third embodiment of the first aspect of the present invention, the reference signal may for instance be determined from the representations of the audio signals recorded by the recoding devices as that representation that exhibits, among all of the representations, the largest sum of respective extreme (e.g. maximum or minimum) values of a similarity analysis function with respect to the other representations. Thus, in case that there are M recording devices in the set of recording devices, and one representation per recording device, for each representation, the respective M−1 extreme values of the respective similarity analysis functions (e.g. the maximum values of the cross-correlations or the minimum values of the differences) with respect to all other M−1 representations may be determined and summed to obtain one sum value per representation, and the representation with the largest (in case of forming cross-correlations) or smallest (in case of forming differences) sum value then may be considered as the reference signal.

In this third embodiment of the first aspect of the present invention, the relevance levels of the recording devices are determined by grouping the delays into groups respectively representing the relevance levels.

There may for instance be one group per relevance level, e.g. if there are M recording devices in the set of recording devices, and K different relevance levels, then there may be M/K delays per group (assuming M is divisible by K). Equally well, the number of delays per group may be different across the groups.

The relevance level may for instance decreases with increasing delay so that a small delay indicates a high relevance and high delay indicates a low relevance.

According to a fourth embodiment of the first aspect of the present invention, the information on the set of one or more selected recording devices is received, and the selected recording devices of the set of selected recording devices are selected at a second apparatus on which the one or more combined audio signals are to be rendered. This selection may for instance be performed by a user, or automatically by the second apparatus (for instance by an application executed by the second apparatus), for instance based on a selection rule.

In the fourth embodiment of the first aspect of the present invention, the relevance levels may for instance be determined by the first apparatus and provided to the second apparatus as an at least partial basis for selecting the selected recording devices of the set of selected recording devices. In addition, further information associated with the relevance levels may be provided to the second apparatus, for instance information on the position (if available) and/or the orientation (if available) of the recording device to which the respective relevance level relates. Such information may for instance be presented to the user (or an application) to allow comfortably selecting the recording devices.

Therein, the selecting may be performed by a user of the second apparatus or automatically by the second apparatus (for instance by an application executed by the second apparatus).

According to a fifth embodiment of the first aspect of the present invention, the one or more recording devices are selected by the first apparatus to obtain the set of selected recording devices, and the relevance levels are determined by the first apparatus.

According to a sixth embodiment of the first aspect of the present invention, the selected recording devices in the set of selected recording devices are selected from the set of recording devices so that a combination of audio signals recorded by the selected recording devices of the set of selected recording devices provides a targeted listening impression. The relevance levels may for instance be related to the targeted listening impression. The selected recording devices may for instance be selected from the set of recording devices so that a combination of only those audio signals recorded by the selected recording devices of the set of selected recording devices provides the targeted listening impression.

In the sixth embodiment of the first aspect of the present invention, the selected recording devices of the set of selected recording devices are selected based on the relevance levels and on a selection rule that at least depends on the targeted listening impression and relates to the relevance levels. The selected recording devices may for instance be automatically selected, for instance by the first apparatus or a second apparatus on which the one or more combined audio signals are to be rendered, based on the relevance levels and the selection rule. The selection rule may for instance define a threshold and require that recording devices with respective relevance levels above or below the threshold shall be selected. The selection rule may for instance a pre-defined selection rule. For different targeted listening impressions, for instance respectively different selection rules, which may for instance be pre-defined, may exist. The targeted listening impressions may for instance be defined or chosen from a set of targeted listening impressions by a user, for instance by the user of the second apparatus, or by an application executed by the second apparatus, to name but a few examples. Alternatively, the targeted listening impression may be pre-defined. The selection rule may further depend on measured/estimated orientations of the recording devices.

In the sixth embodiment of the first aspect of the present invention, the targeted listening impression may be one of a near-end listening impression and a far-end-listening impression. To achieve a near-end listening impression, for instance only audio signals recorded by recording devices considered to be close to an audio source may be combined, whereas to achieve a far-end listening impression, for instance only audio signals recorded by recording devices considered to be far apart from the audio source may be combined.

In the sixth embodiment of the first aspect of the present invention, the targeted listening impression may be selected from a set of at least two pre-defined different targeted listening impressions. The set may for instance comprise at least a near-end and a far-end listening impression. The selection may for instance be performed by a user of a second apparatus on which the one or more combined audio signals are to be rendered, or by an application executed by the second apparatus.

According to a seventh embodiment of the first aspect of the present invention, at least two at least partially different sets of selected recording devices are determined (by selecting recording devices) from the same set of recording devices. The at least two different sets of selected recording devices may for instance further be determined based on the same set of recorded audio signals. The at least two different sets of selected recording devices may for instance be associated with respectively different targeted listening impressions. An apparatus (e.g. the second apparatus) may for instance provide information on which set of selected recording devices is desired (for instance by providing information on the desired targeted listening impression), and accordingly combined audio signals recorded by the selected recording devices of the desired set of selected recording devices may then be produced (or their production may be triggered) by the first apparatus, for instance to be rendered on this apparatus.

According to a second aspect of the present invention, a method is disclosed, comprising:
receiving, at a second apparatus, one or more combined audio signals obtained from a combination of audio signals recorded by selected recording devices of a set of selected recording devices in an audio scene, the selected recording devices in the set of selected recording devices selected from a set of recording devices at least based on relevance levels determined for the recording devices of the set of recording devices,
providing, before the combination of the audio signals recorded by the selected recording devices in the audio scene is received, to a first apparatus that one of produces and causes the combination of the audio signals recorded by the selected recording devices, one of information on the set of selected recording devices and information allowing the recording devices to be selected by the first apparatus to obtain the set of selected recording devices.

In this second aspect of the present invention, furthermore a computer program is disclosed, comprising program code for performing the method according to the second aspect of the present invention when the computer program is executed on a processor. The computer program may have the same properties already explained with reference to the computer program of the first aspect of the present invention.

In this second aspect of the present invention, furthermore a computer-readable medium is disclosed, having a computer program according to the second aspect of the present invention stored thereon. The computer-readable medium may have the same properties already explained with reference to the computer-readable medium of the first aspect of the present invention.

In this second aspect of the present invention, furthermore a first apparatus is disclosed, configured to perform the method according to the second aspect of the present invention.

In this second aspect of the present invention, furthermore a second apparatus is disclosed, comprising:
means for receiving one or more combined audio signals obtained from a combination of audio signals recorded by selected recording devices of a set of selected recording devices in an audio scene, the selected recording devices in the set of selected recording devices selected from a set of recording devices at least based on relevance levels determined for the recording devices of the set of recording devices, and
means for providing, before the combination of the audio signals recorded by the selected recording devices in the audio scene is received, to a first apparatus that one of produces and causes the combination of the audio signals recorded by the selected recording devices, one of information on the set of selected recording devices and information allowing the recording devices to be selected by the first apparatus to obtain the set of selected recording devices.

In this second aspect of the present invention, furthermore a second apparatus is disclosed, comprising at least one processor; and at least one memory including computer program code, the at least one memory and the computer program code configured to, with the at least one processor, cause the second apparatus at least to:
receive one or more combined audio signals obtained from a combination of audio signals recorded by selected recording devices of a set of selected recording devices in an audio scene, the selected recording devices in the set of selected recording devices selected from a set of recording devices at least based on relevance levels determined for the recording devices of the set of recording devices, and provide, before the combination of the audio signals recorded by the selected recording devices in the audio scene is received, to a first apparatus that one of produces and causes the combination of the audio signals recorded by the selected recording devices, one of information on the set of selected recording devices and information allowing the recording devices to be selected by the first apparatus to obtain the set of selected recording devices.

The second apparatuses according to the second aspect of the present invention may for instance be or be comprised in an electronic device, such as for instance an audio rendering device. Non-limiting examples of such an electronic device are a mobile phone, a personal digital assistant and a computer. The second apparatuses may for instance comprise a user interface and/or a network interface (for instance to interface with a communication network such as the Internet, a cellular communication system, and a WLAN, to name but a few non-limiting examples).

It should be noted that the second aspect of the present invention concerns a method, apparatuses, a computer program and a computer program product that respectively complement the method, apparatuses, computer program and computer program product according to the first aspect of the present invention, so that the above description of the first aspect of the present invention is considered to apply to the second aspect of the present invention as well and is explicitly referred to here. Equally well, the description of the second aspect of the present invention also applies to the first aspect of the present invention and is explicitly considered to be disclosed in the context of the first aspect of the present invention as well, however only in a non-limiting sense.

In the following, specific features and embodiments (exhibiting further features) of the second aspect of the present invention will be described, which are understood to equally apply to the method, apparatuses, system, computer program and computer program product of the second aspect of the present invention as described above. These single features/embodiments are considered to be exemplary and non-limiting, and to be respectively combinable independently from other disclosed features/embodiments with the second aspect of the present invention as described above. Nevertheless, these features/embodiments shall also be considered to be disclosed in all possible combinations with each other and with the second aspect of the present invention as described above.

According to the second aspect of the present invention, the second apparatus provides information on the set of selected recording devices or information allowing the recording devices to be selected by the first apparatus to obtain the set of selected recording devices, wherein the first apparatus is an apparatus at which a combination of audio signals recorded by the selected recording devices is produced or caused. In response to this information, the first apparatus may then produce or cause the combination of the audio signals recorded by the selected recording devices to obtain one or more combined audio signals, and these combined audio signals are received at the second apparatus.

Selection of the recording devices to obtain the set of selected recording devices may take place at the second apparatus or at the first apparatus, or even at a further apparatus. For instance, the selection may be performed by a user of the second apparatus. Equally well, the selection may be performed automatically by the second apparatus (for instance by an application executed by the second apparatus), with or without user input. At the second apparatus (for instance by a user), equally well a selection from at least two at least partially different sets of selected recording devices may be performed, and information on the desired set of selected recording devices may then be provided to the first apparatus. It may also be possible that information provided by a user (or an application) at the second apparatus (or stored in the second apparatus), such as for instance information on a targeted listening impression, is provided to the first apparatus as a basis for the selection.

In any case, selection is based on relevance levels determined for the recording devices in the set of recording devices, for instance based on audio signals recorded by the recording devices, which audio signals may be the same or different with respect to the audio signals combined to obtain the combined audio signals.

According to a first embodiment of the second aspect of the present invention, the set of recording devices is derived from a plurality of recording devices at least under consideration of a position relationship between a desired listening position in the audio scene and measured/estimated positions of the recording devices. For further details, the description of the first embodiment of the first aspect of the present invention is explicitly referred to here.

In this first embodiment of the second aspect of the present invention, the information on the desired listening position may for instance be obtained at the second apparatus from a user of the second apparatus or from an application executed by the second apparatus.

According to a second embodiment of the second aspect of the present invention, the relevance levels are determined at the first apparatus and provided to the second apparatus. Alternatively, the relevance levels may also be derived by another apparatus and provided to the second apparatus.

According to a third embodiment of the second aspect of the present invention, the relevance levels of the recording devices are determined at least based on an analysis of a similarity between representations of audio signals recorded by the recording devices. For further details, the description of the second embodiment of the first aspect of the present invention is explicitly referred to here.

According to a fourth embodiment of the second aspect of the present invention, the relevance levels of the recording devices are related to delays of representations of audio signals recorded by the recording devices with respect to a reference signal. For further details, the description of the third embodiment of the first aspect of the present invention is explicitly referred to here.

According to a fifth embodiment of the second aspect of the present invention, information on the set of selected recording devices is obtained at the second apparatus from a user of the second apparatus or from an application executed by the second apparatus. The user may for instance select the recording devices via a user interface so that the set of selected recording devices is available at the second apparatus and may then be provided to the first apparatus. Alternatively, the information on the set of selected recording devices may allow identification (for instance by the first apparatus) of one of at least two different sets of selected recording devices, that may for instance be determined and provided at the first apparatus and provided to the second apparatus. Then, at the first apparatus, for instance respective combinations of audio signals for at least two different sets of selected recording devices (which may for instance be respectively representative of different targeted listening impressions) may be produced/caused, and a user of the second apparatus may then choose which combined audio signals shall be received by the second apparatus by providing the information on the set of selected recording signals (for instance in terms of the targeted listening impression associated with the chosen set of selected reproduction devices). Equally well, only the combination of the audio signals recorded by the selected recording devices of the chosen set of selected recording devices may be produced/caused by the first apparatus.

According to a sixth embodiment of the second aspect of the present invention, the selected recording devices in the set of selected recording devices are selected from the set of recording devices so that a combination of audio signals recorded by the selected recording devices of the set of selected recording devices provides a targeted listening impression. For further details, the description of the sixth embodiment of the first aspect of the present invention is explicitly referred to here.

According to a seventh embodiment of the second aspect of the present invention, the one or more combined audio signals are rendered at the second apparatus. To this end, the second apparatus may for instance comprise one or more loudspeakers or headphones.

According to a third aspect of the present invention, a system is disclosed, comprising a first apparatus according to the first aspect of the present invention and a second apparatus according to the second aspect of the present invention.

It should be noted that the above description of the first and second aspects of the present invention is considered to apply to the third aspect of the present invention as well and is explicitly referred to here.

These and further concepts of the invention will be apparent from and elucidated with reference to the detailed description presented hereinafter.

BRIEF DESCRIPTION OF THE FIGURES

In the figures show:

FIG. 10b: a ranked and transformed representation of the audio scene of FIG. 10a;

DETAILED DESCRIPTION OF EMBODIMENTS OF THE INVENTION

The present invention pertains to multi-device audio capture. An example of an according "remote-listening" application scenario is given in FIG. 1.

Figure 1:
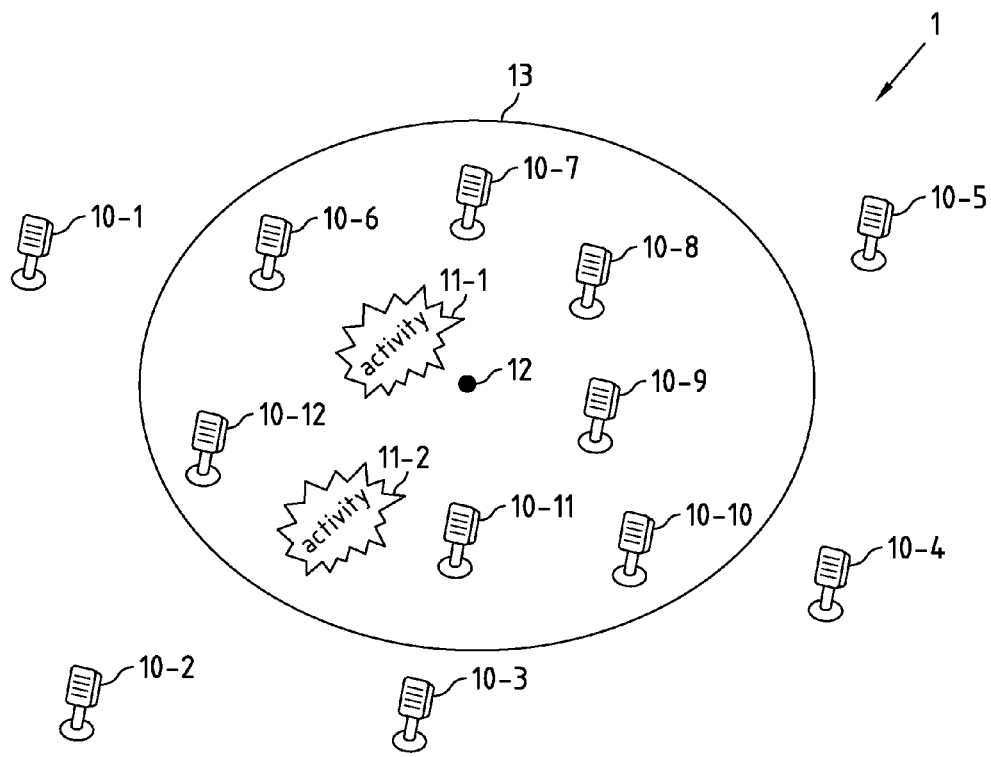
FIG. 1: An example of an audio space in which audio signals are recorded according to embodiments of the present invention.

FIG. 1 depicts an example of an audio space 1 where a plurality of recording devices 10-1 . . . 10-12 have been deployed to record an audio scene. The deployment may for instance be arbitrary or according to a deployment rule, for instance according to a regular grid. The recording devices 10-1 . . . 10-12 may comprise microphones with directional beams, but equally well, omnidirectional microphones or any other beam-shape may be used at some or all of the recording devices 10-1 . . . 10-12. In audio space 1, two sound activity centres and 11-2 are depicted, which may for instance be considered to represent audio sources. For later reference, also a desired listening position 12 and an area around 13 around this desired listening position are shown.

Figure 2:
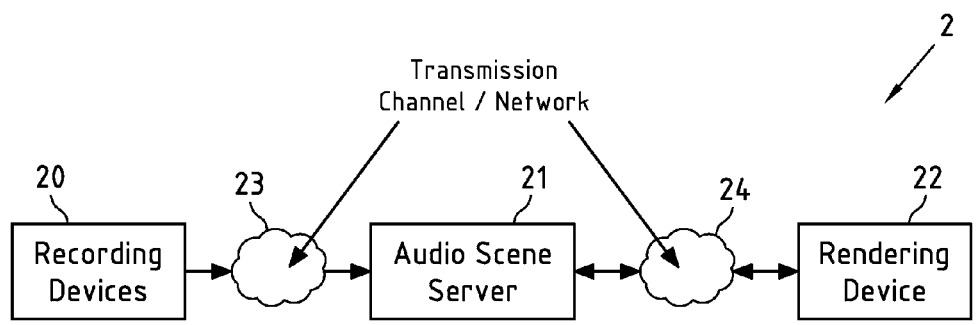
FIG. 2: a schematic block diagram of a system according to an embodiment of the present invention.

FIG. 2 shows a schematic block diagram of an end-to-end system 2 according to an exemplary embodiment of the present invention. The system comprises a plurality of recording devices 20 (corresponding to recording devices 10-1 . . . 10-12 of FIG. 1), an audio scene server 21, and a rendering device 22. Information between the recording devices 20 and the audio scene server 21 is exchanged via a transmission channel/network 23, and information between the audio scene server 21 and the rendering device 22 is exchanged between a transmission channel/network 24.

Each of the recording devices 20 may then record (for instance at least temporarily continuously) the audio scene, for instance in response to being triggered (for instance by audio scene server 21), or in response to a monitoring of audio activity in its vicinity, and may provide the one or more recorded audio signals to the audio scene server 21, for instance by (real-time or non-real-time) uploading/upstreaming, which may be based on a wire-bound and/or wireless data network 23 that can be used/accessed by both the recording devices 20 and the audio scene server 21. Non-limiting examples of such networks are WLANs, cellular communications systems or fixed IP networks or combinations thereof.

In addition, further position information indicating where the audio signals are recorded and the recoding direction/orientation may be provided by the recording devices 20 to the audio scene server 21. Therein, a recording device may record one or more audio signals at a time. The recording direction/orientation of these audio signals may then be different. The position information may for instance be obtained by a Global Navigation Satellite System (GNSS), like for instance the Global Positioning System (GPS) or the GALILEO or GLONASS system. Alternatively, the position information may for instance also be obtained based on triangulation methods, for instance based on (audio/radio) signals received from three or more sources with known positions. Recording directions/orientations may for instance be obtained from compass, accelerometer and/or gyroscope information.

It may be advantageous that many recording devices 20 record the audio scene at different positions, but in close proximity. The audio scene server 21 may then receive the audio signals recorded by the recording devices 20 and may keep track of the positions and the associated directions/orientations.

The audio scene server 21 may provide high level coordinates, which correspond to locations where uploaded/upstreamed content is available for listening. These high level coordinates may be provided, for example, as a map to the user of rendering device 22 to enable the user to select a desired listening position, such as listening position 12 in FIG. 1. The user or for instance an application used by the user may then be responsible for determining the desired listening position, and information on this desired listening position may then be provided to the audio scene server 21.

The audio scene sever 21 may now, based on this desired listening position (see position 12 in FIG. 1) and on the positions of the recording devices 20 (e.g. recording devices 10-1 . . . 10-12 in FIG. 1), determine which of the recording devices 20 are located near this desired listening position (for instance recording devices 10-6 . . . 10-12 in FIG. 1) and could combine the audio signals recorded by these recording devices into a combined audio signal to be forwarded (via transmission channel/network 24) for rendering to the rendering device 22.

This approach may however have the drawback that the positioning of the recording devices 20 (which in case of GPS is around 1 to 15 meters) may be inaccurate or insufficient to properly select the recording devices 20 that are really in the vicinity of the desired listening point. In case of erroneous position measurements/estimation for the recording devices 20, audio signals of recording devices 20 may be combined into the combined audio signal to be rendered by the rendering device 22 that are not located near the desired listening position, and/or audio signals of recording devices 20 actually located quite close to the desired listening position are not combined into the combined audio signal to be rendered by the rendering device 20.

Furthermore, in some situations, position information for the recording devices 20 may not be available at all (e.g. GNSS generally does not work well in indoor scenarios).

Even further, regardless if (accurate) position information is available or not for the recording devices 20, the number of recording devices 20 may be quite large, so that the combination of the audio signals recorded by all of these recording devices 20 may become computationally demanding. Complexity may for instance be reduced by randomly dropping recording devices; this may however result in very minimal control on the audio scene composition and in a high probability of perceptual degradation of the combined audio signals.

Accordingly, embodiments of the present invention introduce a ranking of the recording devices by determining relevance levels for the recording devices, the relevance levels being indicative of the perceptual importance of the recording devices. At least based on the relevance levels, a set of selected recording devices, i.e. a subset of the overall number of recording devices 20, is determined, and only the audio signals recorded by these selected recording devices are combined into the combined audio signal to be rendered (or stored for later rendering) by the rendering device 22. The ranking (relevance level determination) of the recording devices 20 enables different audio scene compositions to be created and offered to the user of the rendering device 22 or to an application running on rendering device 22.

Therein, as a pre-processing stage, still the number of recording devices 20 (e.g. recording devices 10-1 . . . 10-12) may be reduced by further considering only those recording devices 20 that—according to their measured/estimated positions—are assumed to be located near a desired listening position (e.g. recording devices 10 . . . 6-10-12 that are located within area 13 around listening position 12 in FIG. 1). This step is however not mandatory. Equally well, the ranking may be performed for all recording devices 20 available, and the selection may then be based on all of these recording devices 20.

Therein, the selection of the recording devices to be included into the set of selected recording devices (based on which then the combined audio signal for rendering by the rendering device 22 is produced), may for instance be performed by audio scene server 21 (for instance based on a targeted listening impression (representing a specific audio scene listening method), which may for instance be pre-defined or selected from a set of different alternatives or defined by a user of rendering device 22), or by rendering device 22 (for instance based on a targeted listening impression, which may for instance be pre-defined or selected from a set of different alternatives or defined by a user of rendering device 22), or by a user of rendering device 22. An according information exchange between audio scene 21 and rendering device 22 via the transmission channel/network 24 to accomplish this is indicated by the double-sided arrows in FIG. 2. It may also be the case that audio scene server provides more than one set of selected recording devices (and accordingly different listening impressions) for selection to the rendering device 22. Further details on the selection process will be provided below.

The ranking (determining of the relevance levels) may for instance be performed by audio scene server 21. Further details on the ranking process will also be provided below.

The combination of the audio signals recorded by the selected recording devices is performed by audio scene server 21 and yields one or more combined audio signals (the so-called "director's cut") that are forwarded via transmission channel/network (which may for instance at least partially be Internet-based) to rendering device 22 for rendering. These one or more combined audio signal(s) may for instance be mono, stereo, binaural or multiple-channel signals, to name but a few examples. Even when recording devices are selected by the audio scene server 21, nevertheless relevance levels may be provided to the rendering device 22, for instance in case exploration of the audio scene is feasible for the end user for example to enhance the listening impression.

Figure 3:
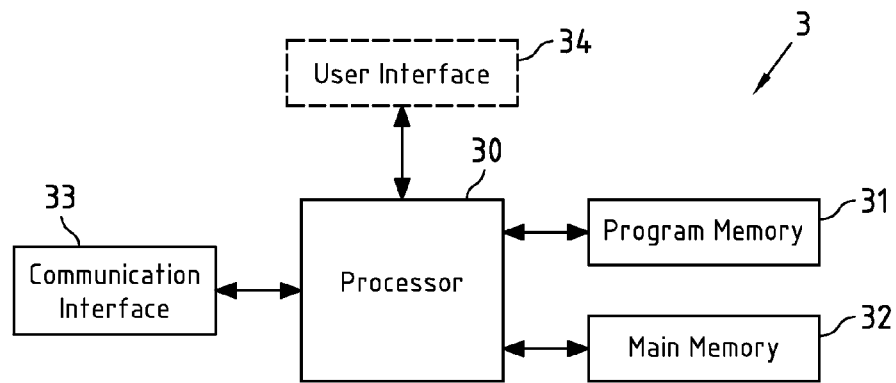
FIG. 3: a schematic block diagram of a first apparatus according to an embodiment of the present invention.

FIG. 3 is a schematic illustration of an apparatus 3 (denoted as "first" apparatus in the claims) according to an embodiment of the present invention. This apparatus 3 may for instance represent audio scene server 21 of FIG. 2, or a part of audio scene server 21. Apparatus 3 is in particular configured to either determine or receive a set of selected recording devices, and to either perform or cause combination of the audio signals recorded by the selected recording devices to obtain one or more combined audio signals.

Apparatus 3 comprises a processor 30, which may for instance be embodied as a microprocessor, Digital Signal Processor (DSP), Application Specific Integrated Circuit (ASIC), to name but a few non-limiting examples. Processor 30 executes a program code stored in program memory 31, and uses main memory 32 as a working memory, for instance to at least temporarily store intermediate results, but also to store for instance pre-defined parameters. Some or all of memories 31 and 32 may also be included into processor 30. Memories 31 and/or 32 may for instance be embodied as Read-Only Memory (ROM), Random Access Memory (RAM), to name but a few non-limiting examples. One of or both of memories 31 and 32 may be fixedly connected to processor 30 or removable from processor 30, for instance in the form of a memory card or stick.

Processor 30 further controls a communication interface 33 configured to receive and/or output information. For instance, communication interface 33 may be configured to exchange information with other components of audio scene server 21 of FIG. 2, or with the recording devices 20 of FIG. 2, or with components (e.g. network nodes) of transmission channel/network of FIG. 2. Communication interface 33 may be further configured to exchange information with rendering device 22 or with components (e.g. network nodes) of transmission channel/network 24.

Processor 30 further controls an optional user interface 34 configured to present information to a user of apparatus 3 (e.g. to a human controller of audio scene server 21 of FIG. 2) and/or to receive information from such a user.

Figure 4:
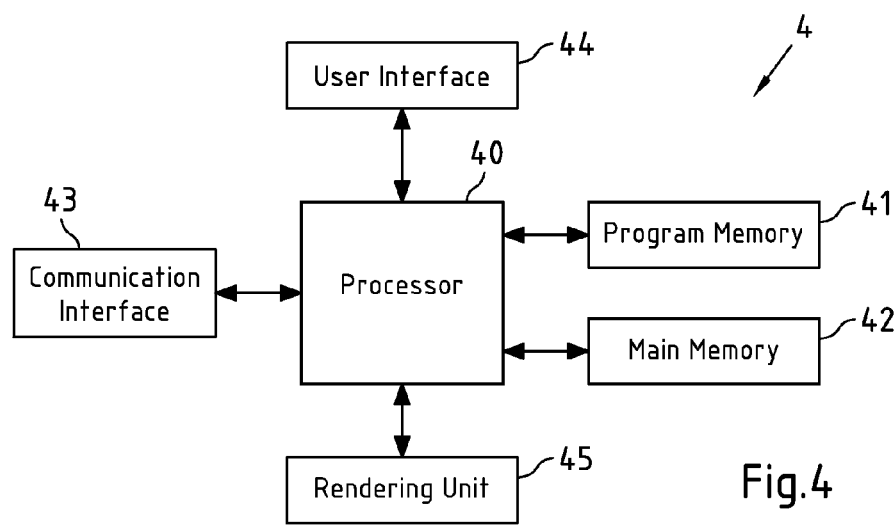
FIG. 4: a schematic block diagram of a second apparatus according to an embodiment of the present invention.

FIG. 4 is a schematic illustration of an apparatus 4 (denoted as "second" apparatus in the claims) according to an embodiment of the present invention. This apparatus 4 may for instance represent rendering device 22 of FIG. 2, or a part of rendering device 22. Apparatus 4 is in particular configured to provide to the audio scene server 21 either information on the set of selected recording devices or information allowing the recording devices to be selected by the audio scene server 21 to obtain the set of selected recording devices, and to receive, from the audio scene server 21, combined audio signals obtained from a combination of audio signals recorded by the selected recording devices.

Apparatus 4 comprises a processor 40, which executes program code stored in program memory 41, and uses main memory 42 as a working memory, for instance to at least temporarily store intermediate results, but also to store for instance pre-defined parameters. For the specific implementation of processor 40 and memories 41 and 42, it is referred to the according description of processor 30 and memories 31 and 32 of the apparatus 3 of FIG. 3.

Processor 40 further controls a communication interface 43 configured to receive and/or output information. For instance, communication interface 43 may be configured to exchange information with other components of rendering device 22 of FIG. 2, or with the audio scene server 21 of FIG. 2, or with components (e.g. network nodes) of transmission channel/network 24 of FIG. 2.

Processor 40 further controls a user interface 44 configured to present information to a user of apparatus 4 (e.g. to a user of rendering device 22 of FIG. 2) and/or to receive information from such a user.

Finally, processor 40 further controls a rendering unit 45 that is configured to render (e.g. play) audio signals, in particular the combined audio signals received by apparatus 4. This rendering unit 45 may for instance comprise one or more loudspeakers or headphones.

The circuitry formed by the components of apparatuses 3 and 4 may be implemented in hardware alone, partially in hardware and in software, or in software only, as further described at the end of this specification.

Figure 5:
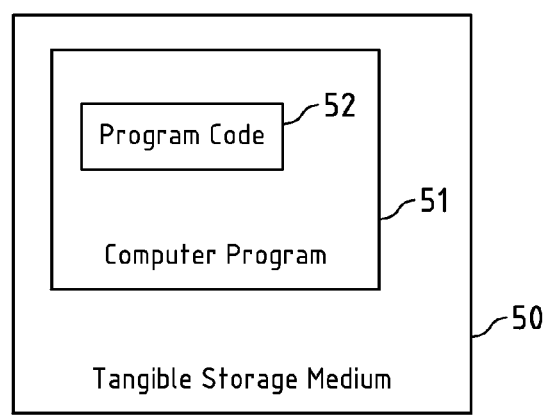
FIG. 5: a schematic illustration of a tangible storage medium according to an embodiment of the present invention.

FIG. 5 is a schematic illustration of a tangible storage medium 50 according to an embodiment of the present invention. This tangible storage medium may for instance form at least a part of program memory 31 of the apparatus 3 of FIG. 3, or of program memory 41 of apparatus 4 of FIG. 4. It may for instance be embodied as RAM or ROM memory, but equally well as a removable memory, like for instance a memory card or stick. Tangible storage medium 50 comprises a computer program 51, which in turn comprises program code 52. This program code may for instance implement the methods of flowcharts 100-600 of FIGS. 6a-7c, which will be discussed below.

Figure 6A:
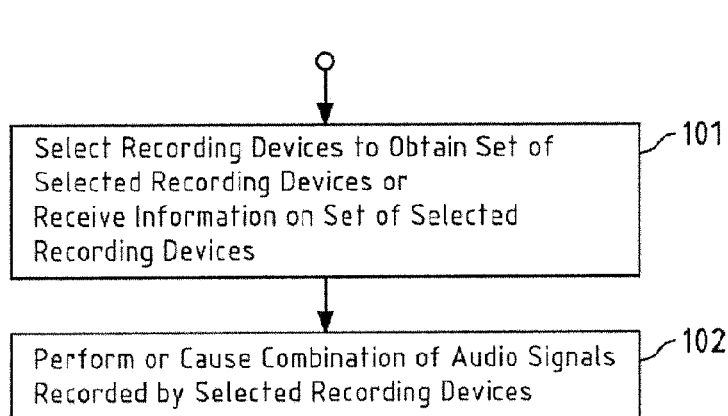
FIG. 6a: a flowchart of a method performed by a first apparatus according to an embodiment of the present invention.
Figure 6B:
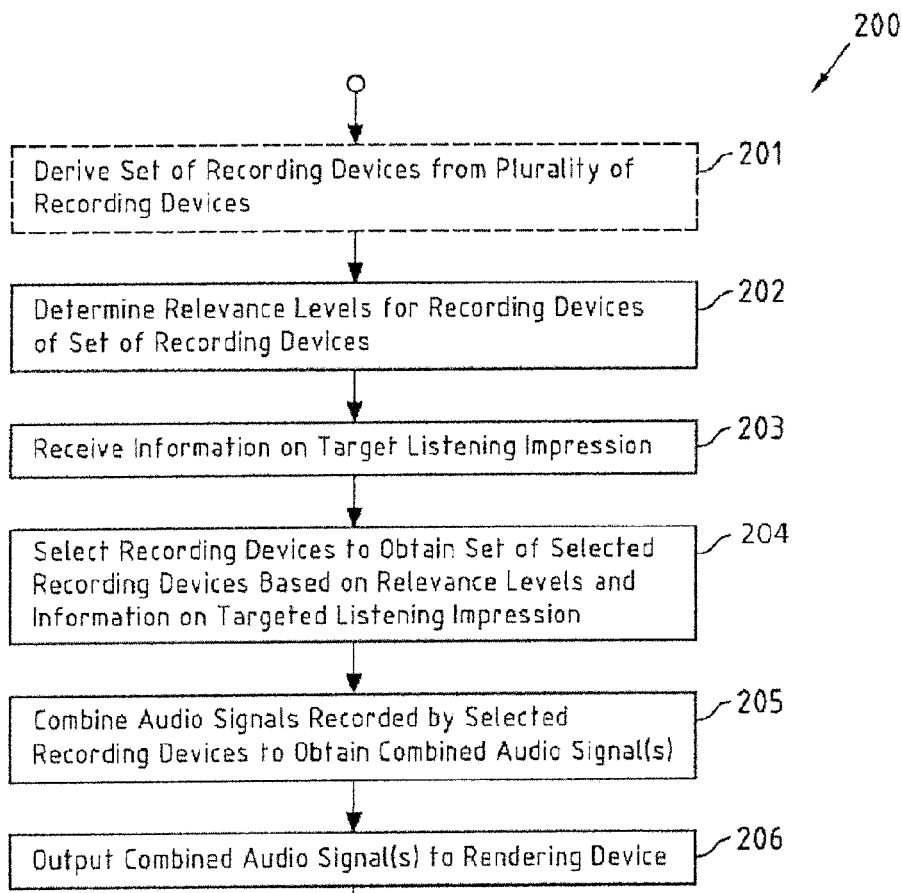
FIG. 6b: a flowchart of a method performed by a first apparatus according to an embodiment of the present invention.
Figure 6C:
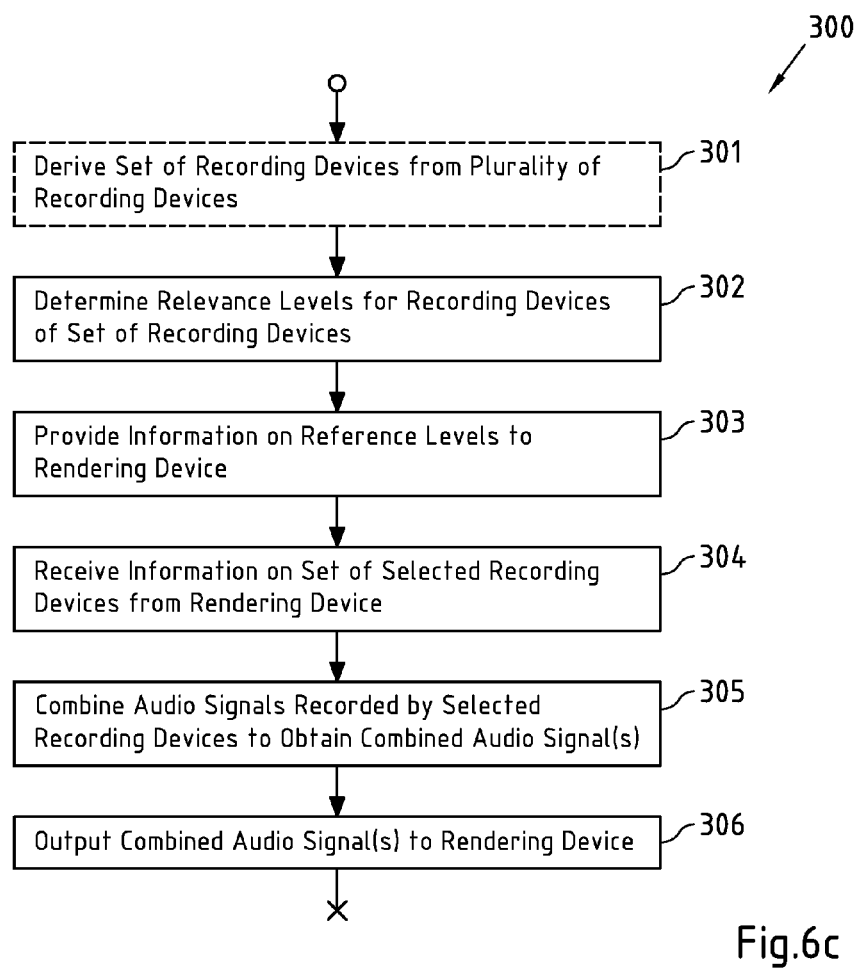
FIG. 6c: a flowchart of a method performed by a first apparatus according to an embodiment of the present invention.

FIGS. 6a-6c represent flowcharts of methods performed by apparatus 3 of FIG. 3 according to respective embodiments of the present invention.

In a step 101 of flowchart 100 of FIG. 6a, recording devices are selected to obtain a set of selected recording devices, or information on a set of selected recording devices is received. In a step 102, then combination of audio signals recorded by the selected recording devices as selected or received in step 101 are performed or caused.

Flowchart 200 of FIG. 6b refines the processing of flowchart 100 of FIG. 6a for the example case that the recording devices are selected by apparatus 3 of FIG. 3.

In an optional step 201, a set of recording devices is derived from a plurality of recording devices. This derivation may for instance be based on a desired listening position, which may for instance have been received from rendering device 22 of FIG. 2 (for instance a listening position desired by an application running on rendering device 22 or by a user of rendering device 22). Then for instance from the plurality of recording devices 10-1 . . . 10-12 shown in FIG. 1, a set of recording devices 10-6 . . . 10-12 is formed with recording devices 10-6 . . . 10-12 that are in a limited area 13 around the desired listening position. However, as already stated above, this step 201 is optional, since the ranking and selection according performed by embodiments of the present invention also works for any constellation of recording devices, even if no position information is available or if such information shall not be used restrictively. If step 201 is not performed, all available recording devices are considered to form the set of recording devices.

In a step 202, respective relevance levels for the recording devices in the set of recording devices are determined. This may be performed by applying a similarity analysis function to representations of audio signals recorded by the recording devices.

An example of such a similarity analysis function is the normalized cross-correlation, which is defined in equation (2) below and will be further discussed in the description of FIG. 8.

An alternative example for a similarity analysis function is presented by G. C. Carter, A. H. Nutall, and P. G. Cable in "The Smoothed Coherence Transform", Proceedings of the IEEE, vol. 61, no. 10, pp. 1497-1498, October 1973. The smoothed coherence transform described in this reference is a Fourier transform of the weighted cross-correlation, wherein for weighting, for instance a Hanning bell function may be used. The smoothed coherence transform can be used to determine delays between two signals or processes (or, as in the present case, representations of audio signals recorded by the recording devices) as explained in the above-cited reference.

A further alternative example of a similarity analysis function is presented by R. Cusani in "Performance of Fast Time Delay Estimators" IEEE Transactions on Acoustics, Speech, and Signal Processing, vol. 37, no. 5, pp. 757-759, May 1989". Therein, for instance one or both of the signals to be cross-correlated are replaced by their hard-limited versions in the cross-correlation. The resulting function may then be analysed to determine the delays as will be described with respect to the normalized cross-correlation case (see the discussion of FIG. 8) below.

A further alternative example of a similarity analysis function is the Average Magnitude Difference Function (AMDF) that is for instance described by J. Chen, J. Benesty and Y. Huang in "Performance of GCC and AMDF Based Time Delay Estimation in Practical Reverberant Environments", EURASIP Journal on Applied Signal Processing, vol. 1, pp. 25-36, 2005. The AMDF analyses the magnitude of the difference between two signals for different shifts of the signals. The shift associated with the minimum value of the AMDF then indicates the delay between both signals. In this reference, also similarity analysis functions based on combinations of AMDF and cross-correlation as presented. For instance, a Generalized Cross-Correlation (GCC) function (for instance corresponding to the smoothed coherence transform described above) is weighted by the reciprocal of the AMDF. The resulting function may then be analysed to determine the delays as will be described with respect to the normalized cross-correlation case (see the discussion of FIG. 8) below.

Returning to the flowchart 200 of FIG. 6b, in a step 203, information on a targeted listening impression is received, for instance from rendering device 22 of FIG. 2, where the targeted listening impression (which may also be referred to as a targeted listening experience) may for instance be specified by a user or application. The targeted listening impression may for instance be specified as near-end or a far-end listening impression.

In a step 204, then recording devices from the set of recording devices are selected to obtain a set of selected recording devices. This selecting is based on the relevance levels determined in step 202 and the information on the targeted listening impression received in step 203. For instance, a selection rule that depends on the targeted listening impression may be applied in this selecting.

In a step 205, the audio signals recorded by the selected recording devices are combined to obtain one or more combined audio signals.

In a step 206, these combined audio signals are then output to the rendering device 22 of FIG. 2 for rendering.

Flowchart 300 of FIG. 6c refines the processing of flowchart 100 of FIG. 6a for the example case that the recording devices are selected by a user of rendering device 22 of FIG. 2 and then received by apparatus 3 of FIG. 3.

Therein, steps 301 and 302 correspond to steps 201 and 202 of flowchart 200 of FIG. 6b, respectively.

In a step 303, information on the relevance levels determined for the recording devices is provided to the rendering device 22 of FIG. 2. At rendering device 22, a user may then perform the selection of the recording devices based on this information.

In a step 304, accordingly information on the set of selected recording devices is received from the rendering device 22 of FIG. 2.

Steps 305 and 306 then again correspond to steps 205 and 206 of the flowchart 200 of FIG. 6b, respectively.

Figure 7A:
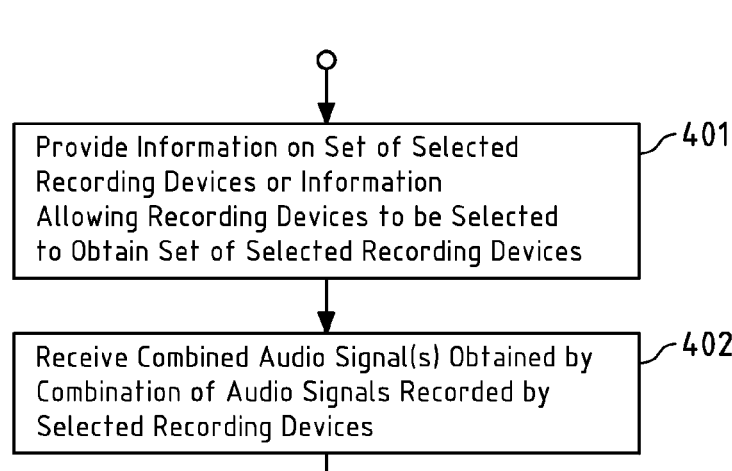
FIG. 7a: a flowchart of a method performed by a second apparatus according to an embodiment of the present invention.
Figure 7B:
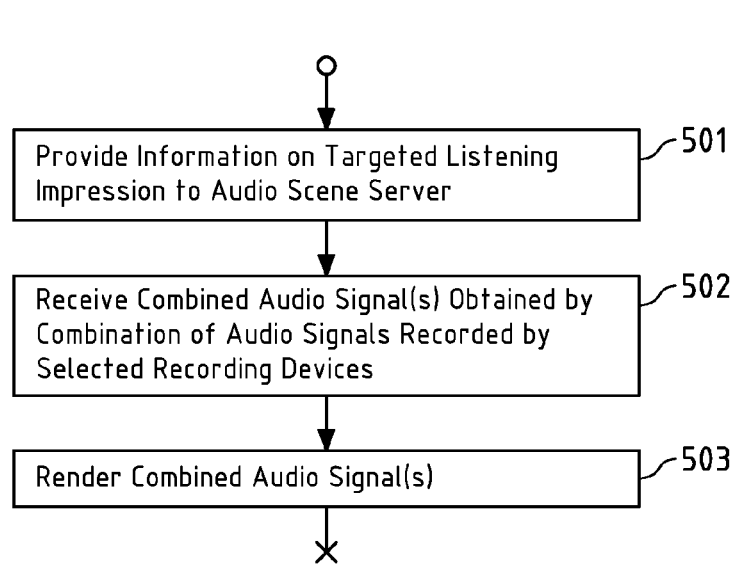
FIG. 7b: a flowchart of a method performed by a second apparatus according to an embodiment of the present invention.
Figure 7C:
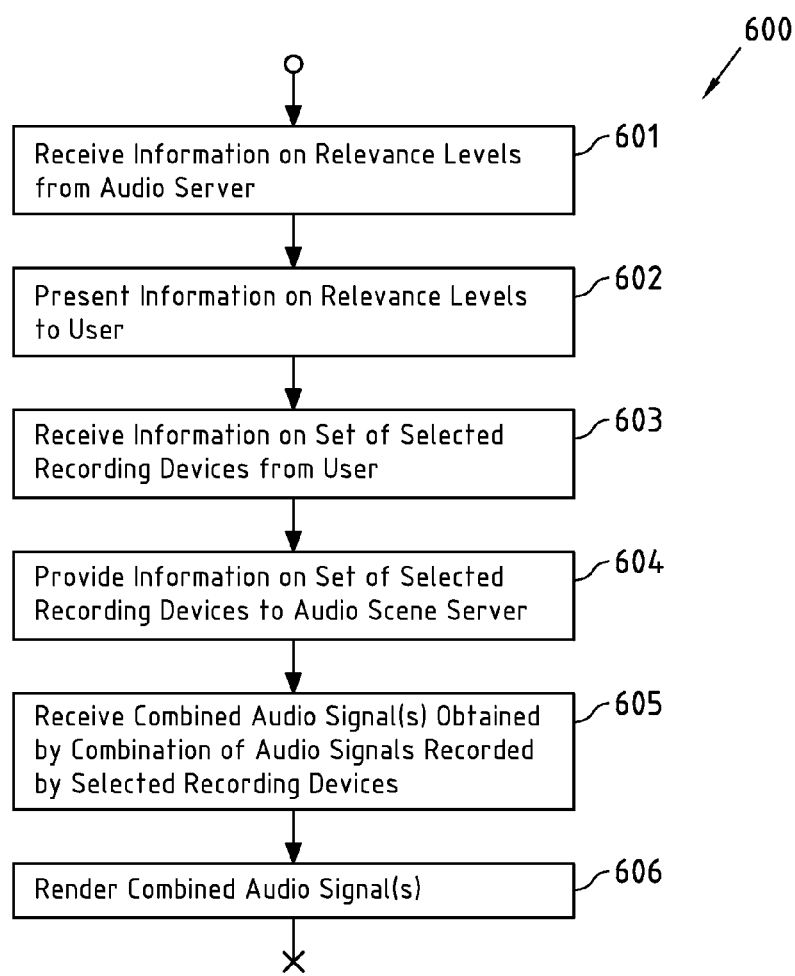
FIG. 7c: a flowchart of a method performed by a second apparatus according to an embodiment of the present invention.

FIGS. 7a-7c represent flowcharts of methods performed by apparatus 4 of FIG. 4 according to respective embodiments of the present invention.

In a step 401 of flowchart 400 of FIG. 6a, information on the set of selected recording devices or information allowing recording devices to be selected to obtain the set of selected recording devices is provided to the audio scene server 21 of FIG. 2. In a step 402, then one or more combined audio signals obtained by combination of the audio signals recorded by the selected recording devices are received from the audio scene server 21 of FIG. 2.

Now, flowchart 500 of FIG. 7b refines the processing of flowchart 400 of FIG. 7a for the example case that the recording devices are selected by apparatus 3 of FIG. 3, based on a targeted listening impression provided by apparatus 4 of FIG. 4. Flowchart 500 thus complements flowchart 200 of FIG. 6b.

Accordingly, in a step 501 such information is provided to the audio scene server 21 of FIG. 2.

In a step 502, one or more combined audio signals are received from the audio scene server 21 of FIG. 2.

In a step 503, the one or more combined audio signals are rendered.

Flowchart 600 of FIG. 7c refines the processing of flowchart 400 of FIG. 7a for the example case that the recording devices are selected by a user of rendering device 22 of FIG. 2 and then received by apparatus 3 of FIG. 3. Flowchart 600 thus complements flowchart 300 of FIG. 6c.

In a step 601, information on relevance levels is received from the audio scene server 21 of FIG. 2.

In a step 602, this information is presented to a user (e.g. via user interface 44 of apparatus 4, see FIG. 4) for selection, and in a step 603, information on the set of selected recording devices is received from the user (e.g. also via user interface 44).

In a step 604, information on the set of selected recording devices is provided to the audio scene server 22 of FIG. 2.

Steps 605 and 606 then again correspond to steps 502 and 503 of the flowchart 500 of FIG. 7b, respectively.

In the following, the actions performed in the flowcharts of FIGS. 6a-7c will be explained in more detail.

Firstly, the derivation of the set of recording devices (e.g. recording devices 10-6 . . . 10-12 of FIG. 1) from the plurality of recording devices (e.g. recording devices 10-1 . . . 10-12 of FIG. 1) will be described (see step 201 of flowchart 200 of FIG. 6b and step 301 of flowchart 300 of FIG. 6c). The set of recording devices may be considered as the "initial" audio scene associated with a desired listening position (e.g. listening position 12 in FIG. 1). It is formed by determining the recording devices to be included in the audio scene using location estimates associated with the recording devices, for example the GNSS information. As an example, this may be performed according to the following steps 1. Let the listening position be at position (x,y)
2. Set m=0 and r=2 meters
3. Find the recording devices that are estimated to be within r meters distance from the desired listening position and that have not yet been included in the initial audio scene. For each of them, increase the value of variable m that indicates the number of recording devices added to the initial audio scene so far.
4. If m<M and r<R
   Increase r=r+2 meters
   Go to step 3
   Else
   Exit Therein, the choice of r=2 meters just represents an example choice, equally well, smaller or larger values can be determined, for instance in dependence on the variable R described below. Furthermore, it is also to be understood that the circle shape for the audio scene is just used as example here. Equally well, any other area-shape, e.g. a rectangular or hexagonal area of desired dimensions including the desired listening point or an area of arbitrary shape including the desired listening point may be used to determine the audio scene associated with the listening point.

The variable M indicates the maximum amount of recording devices that are allowed to enter the initial audio scene (the set of recording devices) and R indicates the maximum estimated distance of a recording device from the desired listening position that is allowed to enter the initial audio scene. Alternatively, for example only the estimated distance of a recording device from the desired listening position may be considered in the selection, i.e. in step 4 only the value of r would then be considered and the number of recording devices m currently included in the audio scene would not be considered.

It should be noted that the position information for the recording devices may not always be available. For example, for indoor recordings, the GNSS position information may not be available. In this case, the initial audio scene may for instance be formed by using the last known GNSS position (for example, the recording device may probe the position every T minutes to maintain the position always updated) and/or by using additional metadata information that a user of the recording device provides when uploading/streaming the content to the audio scene server (for example, recording position: Ice Hockey Center, Tampere) to determine the estimated position. In general, alternative or supplementary position estimation methods may be used in case the primary position estimation method, e.g. GNSS as in this example, is not able to estimate the position at sufficient accuracy/reliability.

Now, the determining of the relevance levels (see step 202 of flowchart 200 of FIG. 6b and step 302 of flowchart 300 of FIG. 6c) will be explained in more detail with reference to FIG. 8, which shows a flowchart 700 of an exemplary embodiment for determining relevance levels according to the present invention.

In a step 701 of flowchart 700, representations of audio signals recorded by the recording devices of the set of recording devices are determined. As far as the selected recording devices are concerned, the recorded audio signals used for the determining of the relevance levels may be the same as those that are combined to obtain the one or more combined audio signals to be rendered by rendering device 22 of FIG. 2. Nevertheless, also audio signals recorded at respectively different times could be used. For instance, if the selection of the recording devices to obtain the set of selected recording devices is performed after the recording of the audio signals is already completed, it may be convenient to use (as far as the selected recording devices are concerned) for the determining of the relevance levels and for the combination, the same recorded audio signals. In contrast, if remote listening of a live event is desired, it may be convenient that the determining of the relevance levels and thus the selection of the recording devices is based on audio signals recorded before the determining/selection, whereas the combining of the recorded audio signals is performed (e.g. live or with only little delay) with audio signals recorded after the determining/selection.

In step 701, if a recorded signal comprises multiple channels, the channels may be converted to a single channel representation, for example by determining the average of the channel signals or of a subset of channel signals, or by selecting only one of the channel signals. This yields one respective representation of recorded audio signals per recording device. Forming this representation may further comprise decimating the recorded audio signals to a lower data rate to reduce the computational complexity of subsequent processing steps. The decimation may be achieved, for example, by lowpass filtering the signal and then taking every $F^{th}$ filtered sample. In an embodiment of such a filter, the passband may for instance be roughly at 0.2 times the Nyquist frequency (that is, half the sampling rate of the recorded audio signal), and the stopband may start roughly at 0.25 times the Nyquist frequency. In this embodiment, the filter characteristics are then such that F can be set to a value of 5.

In a step 702 of flowchart 700, then a reference signal is identified and the delays of the representations of the audio signals recorded by the recording devices with respect to this reference signal are determined. Therein, both the reference signal is identified and the delays are obtained by analyzing the cross-correlation of all pairings of the representations determined in step 701, as will be explained below. In this embodiment, the reference signal is one of the representations of the audio signals recorded by the recording devices.

Generally, the time delay $\tau_{xy}$ between two signals x and y can be calculated, for example, according to $$\tau_{xy} = \mathrm{argmax}_{d}\{\phi_{xy}(d)\}, \qquad (1)$$

where $\phi_{xy}$ is the normalized cross-correlation between the signals x and y, which is defined as $$\phi_{xy}(d) = \frac{\sum_{k=0}^{L-1} x(k) \cdot y(k+d)}{\sqrt{\sum_{k=0}^{L-1} x(k)^2 \cdot \sum_{k=0}^{L-1} y(k)^2}} \qquad (2)$$

where L is the length of the calculation window over which equation (2) is calculated.

In the present embodiment, it is exemplarily assumed that the normalized cross-correlation of equation (2) is used as a similarity analysis function. However, as already stated above, also alternative similarity analysis functions like the smoothed coherence transform, the AMDF, etc. may be used here instead. In case of the AMDF, instead of finding the delay that maximizes the cross-correlation of equation (1), then the delay that minimizes the AMDF has to be found.

Figure 9:
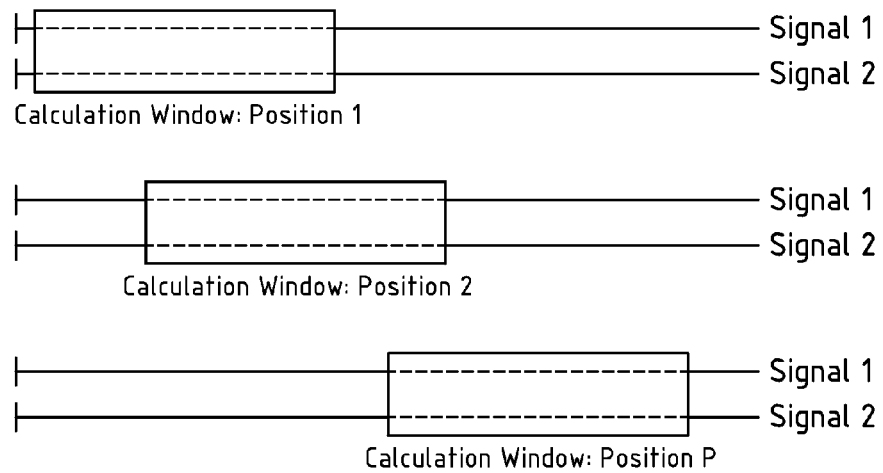
FIG. 9: a schematic illustration of the calculation of the cross-correlation for multiple signal segments according to an embodiment of the present invention.

According to an embodiment of the invention, the time delay $\tau_{xy}$ is calculated at multiple temporal positions in a pair of signals x and y, i.e. using multiple different segments from the pair of signals x and y, in order to increase the robustness of the results. This is schematically illustrated for an example with P different segments in FIG. 9. Finally, the final time delays between the signal pairs are determined from the calculated results.

The process performed in step 702 can be expressed by the following pseudo-code:

```
1   for n₁ = 1 to N
2     for n₂ = 1 to N
3
4       If n₁ equal to n₂
5         Continue to next n₂
6       Reset cr;
7       For r_f = 1:nFrameJump:nFrames
8
9         startIdx = (r_f − 1) * frameSize + 1;
```

-continued

```
10        endIdx = startIdx + windowSize * frameSize − 1;
11        blockSize = endIdx − startIdx;
12
13        x₁ = iX(n₁, startIdx:endIdx);
14        x₂ = iX(n₂, startIdx:endIdx);
15
16        ϕ_xy(d) = Calculate Equation (2), where
              x = x₁; y = x₂;
              d = 1, ..., maxLag;
              L = blockSize-maxLag
17
18        cr = cr + ϕ_xy;
19      End
20
21      Sort entries of cr into decreasing order of
          values. crIdx contains the respective indices of
          the sorted values in order to determine maximum of
          normalized correlation and associated time
          delay.
22
23      crAll (n₁, n₂) = cr (1);
24      idxAll (n₁, n₂) = crIdx (1);
25    End
26  End
27
```

$$28 \quad cr2(n) = \sum_{k=1}^{N} crAll(n, k), \; 1 \le n \le N$$

```
29
30  Sort cr2 into decreasing order of values, crIdx2 contains
      the respective indices of the sorted values in order to
      determine maximum overall correlation and the index
      determining the associated channel
31
32  refIdx = crIdx2 (1);
33  tLag = idxAll (refIdx, 1:N);
```

The variables used in the pseudo-code are as follows: N describes the number of recording devices for the initial audio scene (i.e. the size of the set of recording devices), nFrameJump describes the "hop size" (as number of frames) for the temporal locations at which the time delay is calculated, nFrames describes the total number of frames covered by the signal considered in the analysis (corresponding to the number of segments P in FIG. 9), frameSize describes the size of a frame, windowSize describes the number of successive frames that are used in the delay calculation, and matrix iX contains the respective representations of the recorded audio signals from each recording device within the audio scene (each row in the matrix contains a representation), as determined in step 701 of the flowchart 700.

Lines 9-10 determine the start and end positions of the current calculation window for the current pair of representations.

Line 11 determines the size of the current calculation window.

The segments of the current pair of representations corresponding to the current calculation window are extracted in lines 13-14.

Line 16 calculates the normalized cross-correlation $\phi_{xy}(d)$ between the extracted segments of the representations. In line 18, the correlation $\phi_{xy}$ is then added to vector variable cr which accumulates the results for the current pair of representations calculated at different calculation window positions. Note that the maxLag elements of vector variable cr are initialized in line 7 to zeros before entering the loop starting in line 7.

The accumulated results within the variable cr are then sorted to decreasing order of importance to identify the maximum correlation value and the associated delay, in lines 21-24. Instead of sorting the entries of vector cr in decreasing order, as a potentially less complex alternative, it may be sufficient to find the maximum entry in cr and the associated time delay.

These calculations are done for each representation pair, in lines 1-26, so that crAll (n1, n2) then contains the respective maximum of the cross-correlation for all possible pairs (n1, n2), and idxAll (n1, n2) contains the respective cross-correlation abscissa value/delay for which these maxima of the cross-correlations were achieved. It is understood that both crAll and idxAll have been initialized to all zeros before the pseudo-code is executed.

Line 28 determines, for each representation, the sum cr2(n) of the maxima of the cross-correlation with respect to all other representations.

The accumulated correlation cr2(n) is again sorted to see which representation has the highest correlation with respect to all other representations, in lines 29-30. Instead of sorting the entries of the vector cr2, as an alternative, it may be sufficient to find the maximum entry of cr2 (i.e. the maximum accumulated correlation) and the index identifying the associated representation.

The recording device refIdx corresponding to this representation will serve as a reference recording device to the other recording devices, line 32, and the corresponding representation of this reference recording device will serve as the reference signal. The reference recording device indicates the recording device that receives, in the audio scene, the audio signal first. In case of only one audio source/audio activity centre in the audio scene, the audio signal received by the reference recording device is the audio signal of this single audio source/audio activity centre. In case of several audio sources/audio activity centres in the audio scene (like the two audio activity centres 11-1 and 11-2 in FIG. 1), the audio signal received by the reference recording device may then be considered as a superposition of the audio signals from these audio sources/audio activity centres (Equally well, these audio sources/audio activity centres could be considered to form a single (larger) audio source/audio activity centre). The remaining recording devices receive a similar (or at least substantially similar) audio signal that is only a delayed version of the reference signal received by the reference recording device.

In both cases of single or multiple audio sources/audio activity centres in an audio scene, cross-correlation constitutes an efficient and robust means to identify the most relevant recording devices of this audio scene required for combination/downmixing, although in case of multiple audio sources/audio activity centres, the fine details between the audio sources/audio activity centres may no longer be differentiable. An improved resolution of multiple audio sources/audio activity centres may for instance be achieved by band-pass filtering (for instance instead of only low-pass filtering) the audio signals recorded by the recording devices and ranking these band-pass filtered signals. In this way, frequency-band-specific sets of relevance levels may be obtained, and based on the frequency-band-specific set of relevance levels, also frequency-band-specific sets of selected recording devices and accordingly frequency-band-specific combinations of audio signals recorded by the recording devices to obtain frequency-band-specific combined signals for rendering by the rendering device 22 of FIG. 2 could be obtained.

Returning to the above pseudo-code, finally, in line 33, the time delays tLag of the representations of the other recording devices with respect to the reference signal are determined from idxAll.

Thus, as a result, the index refIdx of the reference recording device/reference signal and an array tLag with the time delays between the representations of the audio signals recorded by the other recording devices with respect to the reference signal are obtained (whereas the first entry of tLag is considered to be zero, and wherein the remaining entries are sorted in decreasing order).

Figure 8:
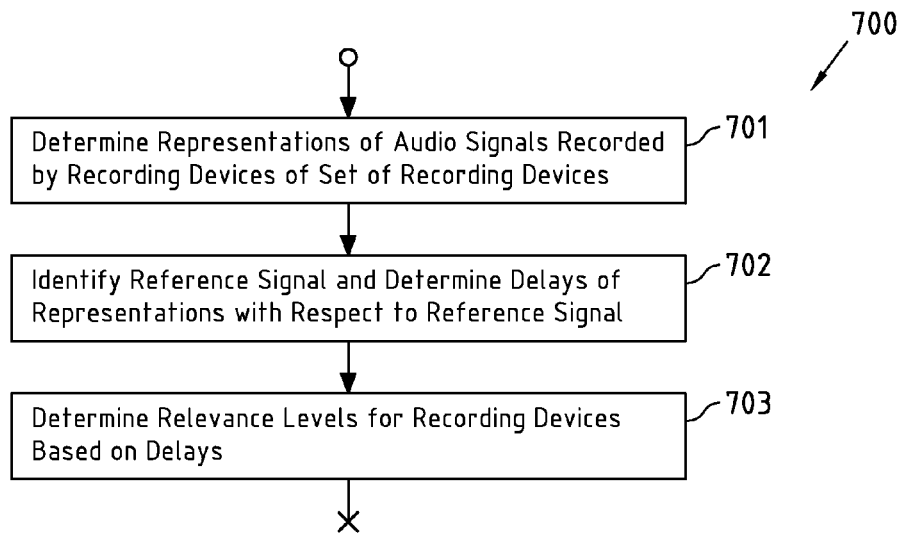
FIG. 8: a flowchart of a method for determining relevance levels according to an embodiment of the present invention.

In a step 703 of flowchart 700 of FIG. 8, relevance levels are determined for the recording devices based on the delays determined in step 702.

The recording devices may for instance be organized into different levels of importance/relevance according to the calculated time delays as follows:
1. Define the number of relevance levels K
2. Organize the recording devices to different levels according to increasing time delay values tLag
   2.1 The $1^{st}$ level contains the sources with the $l_1 = \lfloor M/K \rfloor$ smallest time delays
   2.2 The $2^{nd}$ level contains the sources with the next $l_2 = \lfloor M/K \rfloor$ smallest time delays
   2.K The $K^{th}$ level contains the sources with the $$l_K = M - \sum_{n=1}^{K-1} l_n$$

highest time delays

Therein, the floor function $\lfloor \cdot \rfloor$ rounds its argument to the next smallest integer value.

The following example illustrates these steps for the example case of a number of K=3 different relevance levels:

| Recording devices | A | B | C | D | E | F |
|---|---|---|---|---|---|---|
| Time delays (tLag) | 15 | 0 | 100 | 150 | 25 | 40 |
| Recording devices | B | A | E | F | C | D |
| Sorted time delays | 0 | 15 | 25 | 40 | 100 | 150 |
| Relevance levels | 1 | 1 | 2 | 2 | 3 | 3 |

Based on these relevance levels, recording devices may be manually or automatically selected from the set of recording devices as now described with reference to FIGS. 10a-10d.

Figure 10A:
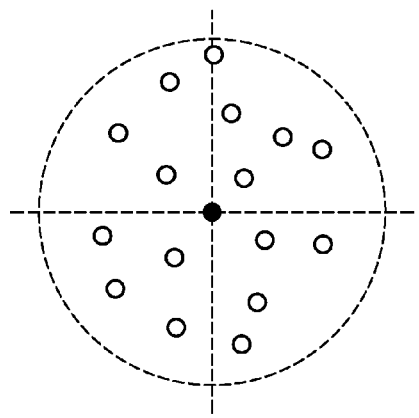
FIG. 10a: an example of an initial audio scene with a set of recording devices.

FIG. 10a shows an example of an initial audio scene with a set of recording devices (depicted as unfilled dots) measured/estimated to locate at different positions. The audio scene is pictured as a dashed circle, the desired listening position being depicted at the centre of the circle as a filled dot. All recording devices that are measured/estimated to fall with the boundaries of the circle are comprised in the audio scene to be associated with the listening point.

For the set of recording devices in FIG. 10a, then three different relevance levels have been determined, for instance as described with reference to flowchart 700 of FIG. 8 above. As an example, the three different relevance levels are assumed to be "1", "2" and "3", where "1" stands for highest relevance (i.e. the representation of the audio signal(s) recorded by this recording device is the reference signal, or has a comparably small delay with respect to the reference signal), and "3" stands for lowest relevance (i.e. the representation of the audio signal(s) recorded by this recording device has a comparably large delay with respect to the reference signal).

Figure 10B:
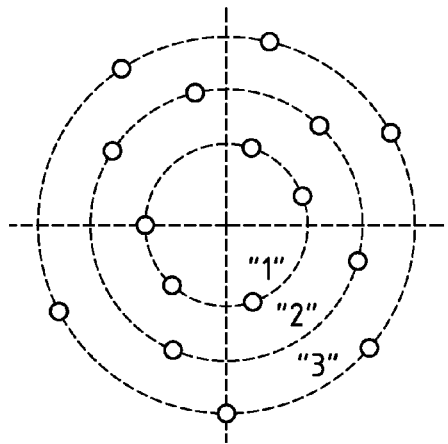

The relevance levels then may be used to transform the audio scene of FIG. 10a into the representation shown in FIG. 10b. Therein, the three circles respectively labelled with "1", "2" and "3" represent the three different relevance levels, wherein the centre of these circle may be understood to represent the main audio source in the audio scene of FIG. 10a, i.e. the audio source to which the reference recording device is considered to have the smallest distance as compared to the other recording devices. On the circles labelled with "1", "2" and "3", then the recording devices that were assigned these relevance levels are placed, wherein the angular position of the recording devices on these circles is basically arbitrary, unless the direction/orientation of the recording device is known, as will be discussed below.

The ranked and transformed audio scene of FIG. 10b may for instance serve as a means of presentation of the relevance levels to a user of rendering device 22 of FIG. 2, if this user shall perform the selection of the recording devices to obtain the set of selected recording devices based on which the one or more combined audio signals are determined. Alternatively, for instance the same set-up of FIG. 10a may be reused, where the recording devices may however be labelled with their assigned relevance level, for instance by displaying the respective relevance level near each recording device, or by using—instead of the unfilled dots—relevance-level-specific symbols/icons for the recording devices. In this way, both the respective measured/estimated positions of the recording devices and the respective relevance levels can be presented in an intuitive way.

Figure 10C:
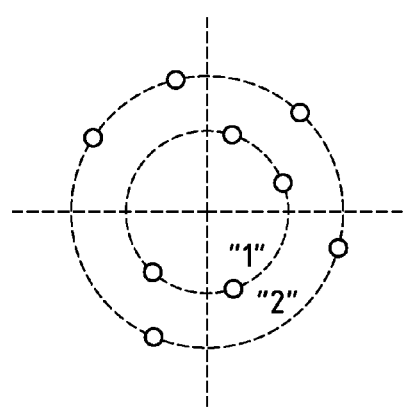
FIG. 10c: selected recording devices from FIG. 10b to obtain a near-end listening impression.
Figure 10D:
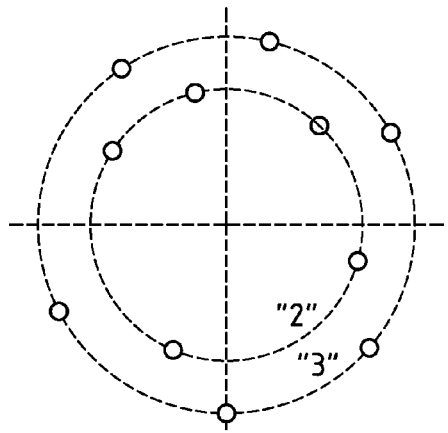
FIG. 10d: selected recording devices from FIG. 10b to obtain a far-end listening impression.

FIGS. 10c and 10d illustrate the respective audio scene composition for two different targeted listening impressions, namely a near-end listening impression (FIG. 10c) and a far-end listening impression (FIG. 10d). It is understood that these targeted listening impressions are examples only, and that any other types of targeted listening impressions could be used.

The near-end listening impression of FIG. 10c describes a situation where the user/listener is placed at close distance with respect to the assumed main audio source or audio activity centre in the audio scene. To create a near-end listening impression, the audio signals recorded by the recording devices at the inner relevance levels "1" and "2" are combined for the end user. In the set-up of FIG. 1, a near-end listening impression with respect to the two sound activity centres 11-1 and 11-2 may for instance be provided by combining the audio signals recorded by recording devices 10-6 . . . 10-9 and 10-11 . . . 10-12.

In contrast, to create a far-end listening impression, as in FIG. 10d, the audio signals recorded by recording devices at the two outer relevance levels "2" and "3" are combined for the end user. In the set-up of FIG. 1, a far-end listening impression with respect to the two sound activity centres 11-1 and 11-2 may for instance be provided by combining the audio signals recorded by recording device 10-9 . . . 10-10.

FIGS. 10b-10d shows three levels for the ranked and transformed audio scene, but naturally, any higher or lower number of relevance levels could be used. For instance, only two relevance levels may be differentiated, whereas the recording devices of the first relevance level then may be selected to create a near-end listening impression, and the recording devices of the second relevance level then may be selected to create a far-end listening impression.

As already stated above, the set of selected recording devices may be determined manually—i.e. by a user—based on the relevance levels, for instance in response to a presentation as that of FIG. 10b or an alternative presentation. For instance, only a list of the relevance levels assigned to the recording devices, for instance like "1"; "1"; "1"; "2"; "3"; "3" may be provided to a user, or, similarly, a list that indicates how many recording devices where assigned a specific relevance levels, for instance like "1":3; "2":1;"3":2. The user may then for instance decide to select only all recording devices with relevance levels "1" and "2". Alternatively, also indices for individual identification of the recording devices may be provided together with the relevance levels, for instance to allow differentiation—within the selection—between recording devices that have the same relevance levels. The relevance levels (with or without indices) may also be accompanied by information on the respective measured/estimated positions of the recording devices. It may also be the case that, in addition to the relevance levels, also the delays based on which these relevance levels have been determined are provided as an aid in the selection process (to indicate differences between recording devices with the same relevance level).

These various kinds of information may of course also be provided to an application or device that automatically performs the selection.

An automatic selection may for instance be based on a pre-defined selection rule that depends on the relevance levels and on a targeted listening impression. An example of such a selection rule for the case of K=3 different relevance levels then may for instance be (as in FIGS. 10c and 10d):

If targeted listening impression=near-end, then selected recording devices with relevance levels 2

If targeted listening impression=far-end, then selected recording devices with relevance levels 2

It is understood that a variety of different selection rules may be defined, also under exploitation of information that exceeds the bare relevance levels.

As an example of further information that may be provided together with relevance information as a basis for the (manual or automatic) selection of the recording devices are the measured/estimated directions/orientations of the recording devices.

Figure 11:
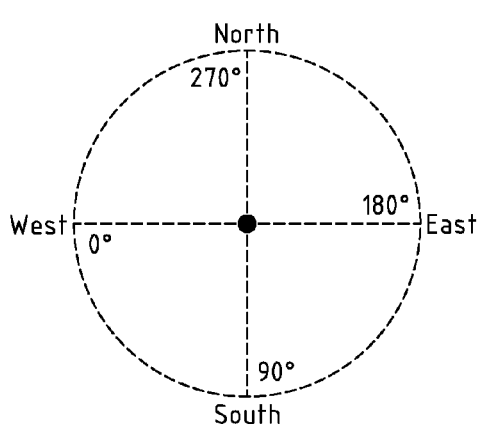
FIG. 11: an example of a convention for conversion of compass information to angle information.

Then, for instance with respect to the presentation method illustrated in FIG. 10b, recording devices within each relevance level may be further transformed according to their direction/orientation information. This transformation may be done for example according to the following steps:

1. Convert the direction/orientation information into angle information in the unit circle
2. Organize the recording devices in each relevance level according to the angle information in the unit circle For example, let the direction/orientation information of a recording device be a compass information. If it is "north"; this is transformed into angle 90° in the unit circle. For example, the conversion from compass information to angle information can be pictured as shown in FIG. 11, but of course any other type of conversion is possible.

The following example (repeated from above) illustrates the above steps (wherein "E", "W", "S", "N", "SW" and "NE" stand for east, west, south, north, south-west and north-east, respectively):

| Recording devices | A | B | C | D | E | F |
|---|---|---|---|---|---|---|
| Relevance levels | 1 | 1 | 3 | 3 | 2 | 2 |
| Orientation | "E" | "W" | "S" | "N" | "SW" | "NE" |
| Converted angle | 180° | 0° | 90° | 270° | 45° | 225° |

Figure 12:
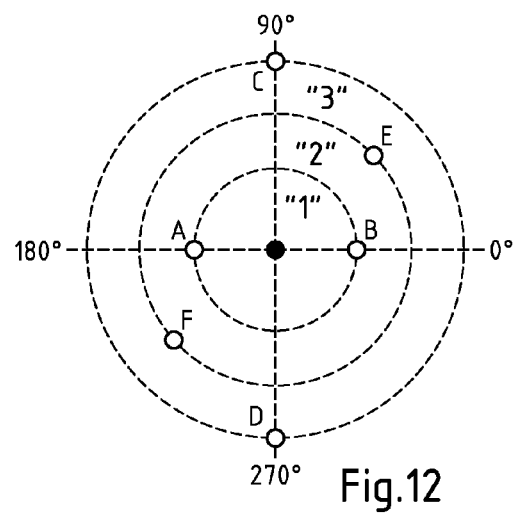
FIG. 12: an example of a ranked and transformed audio scene with direction/orientation information.

The ranked and transformed audio scene corresponding to the above example is illustrated in FIG. 12. Note that, in contrast to the angular positioning in FIGS. 10b-10d, which was arbitrary, the angular positioning of the recording devices in FIG. 12 now reflects the actual direction/orientation of the recording devices.

This direction/orientation information then may also be exploited for the selection of the recording devices (in addition to the relevance levels), for instance by selecting only those recording devices that have a relevance level below 2 and are directed in the first quadrant)(0°-90° of FIG. 12, i.e. recording devices B and E.

This direction/orientation information lends itself also for consideration in a pre-defined selection rule (in addition to the relevance levels).

Finally, the combination of the audio signals recorded by the selected recording devices (see for instance step 102 of flowchart 100 of FIG. 6a, step 205 of flowchart 200 of FIG. 6b and step 305 of flowchart 300 of FIG. 6c) will be explained in more detail.

An example for such a combination is stereo downmixing, where all audio signals of the selected recording devices are summed first and then amplitude-panned such that the signals fit the stereo loudspeaker configuration. The amplitude panning may for instance be based on Vector Based Amplitude Panning (VBAP). The summing and panning may for instance be performed in the frequency domain such that the signals are summed first over all frequency bins and then amplitude panning may be performed on a frequency band basis. Of course, also alternative ways of combination could be used, for instance to obtain a mono signal, binaural signals or multi-channel signals as combined audio signal(s).

As used in this application, the term 'circuitry' refers to all of the following:

(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor (s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. A method of obtaining combined audio signals, the method comprising:

selecting, by a first apparatus, two or more recording devices based on an analysis of a similarity between representations of audio signals recorded by said two or more recording devices by using a similarity analysis function and determining that the representations of the audio signals recorded by said two or more recording devices stem from the same one or more audio sources, and causing, by said first apparatus, a combination of audio signals recorded by said selected two or more recording devices in an audio scene, to obtain one or more combined audio signals for rendering.

2. The method according to claim 1, wherein said two or more selected recording devices are selected from a set of recording devices derived from a plurality of recording devices at least under consideration of a position relationship between a desired listening position in said audio scene and measured or estimated positions of said recording devices.

3. The method according to claim 1, wherein said analysis of similarity is related to delays of representations of said audio signals recorded by said recording devices with respect to a reference signal.

4. The method according to claim 3, wherein said reference signal is determined from said representations of said audio signals recorded by said recording devices as that representation that exhibits, among all of said representations, a largest sum of respective extreme values of a similarity analysis function with respect to the other representations.

5. A method as claimed in claim 1, further comprising:
receiving, at a second apparatus, said one or more combined audio signals,
providing, before said combination of said audio signals recorded by said selected two or more recording devices in said audio scene is received, to the first apparatus information allowing said two or more recording devices to be selected by said first apparatus to obtain said set of selected two or more recording devices.

6. A first apparatus for obtaining combined audio signals, the first apparatus comprising at least one processor; and at least one memory including computer program code, said at least one memory and said computer program code configured to, with said at least one processor, cause said first apparatus at least to:
select two or more recording devices based on an analysis of a similarity between representations of audio signals recorded by said two or more recording devices by using a similarity analysis function and determining that the representations of the audio signals recorded by said two or more recording devices stem from the same one or more audio sources, and
cause a combination of audio signals recorded by said selected two or more recording devices in an audio scene, to obtain one or more combined audio signals for rendering.

7. The first apparatus according to claim 6, wherein said two or more selected recording devices are selected from a set of recording devices derived from a plurality of recording devices at least under consideration of a position relationship between a desired listening position in said audio scene and measured or estimated positions of said recording devices.

8. The first apparatus according to claim 6, wherein said analysis of similarity of said recording devices are related to delays of representations of audio signals recorded by said recording devices with respect to a reference signal.

9. The first apparatus according to claim 8, wherein said reference signal is determined from said representations of said audio signals recorded by said recording devices as that representation that exhibits, among all of said representations, a largest sum of respective extreme values of a similarity analysis function with respect to the other representations.

10. A system for processing multiple-device audio capture comprising first apparatus according to claim 6 and a second apparatus, the second apparatus comprising at least one processor; and at least one memory including computer program code, said at least one memory and said computer program code configured to, with said at least one processor, cause said second apparatus at least to:
receive said one or more combined audio signals, and
provide, before said combination of said audio signals recorded by said selected two or more recording devices in said audio scene is received, to the first apparatus information allowing said two or more recording devices to be selected by said first apparatus to obtain said selected two or more recording devices.

11. The first apparatus according to claim 8, wherein said analysis of similarity of said two or more recording devices are determined by grouping said delays into groups respectively representing said analysis of similarity.

12. The first apparatus according to claim 10, wherein said information on said two or more selected recording devices is received, and wherein said selected two or more recording devices are selected at a second apparatus on which said one or more combined audio signals are to be rendered.

13. The first apparatus according to claim 12, wherein said analysis of similarity is determined by said first apparatus and provided to said second apparatus as an at least partial basis for selecting said selected recording devices of said set of selected two or more recording devices.

14. The first apparatus according to claim 6, wherein said two or more recording devices are selected to obtain said selected two or more recording devices at said first apparatus, wherein said analysis of similarity is determined by said first apparatus.

15. The first apparatus according to claim 6, wherein said selected two or more recording devices are selected so that a combination of audio signals recorded by said selected two or more recording devices provides a targeted listening impression.

16. The first apparatus according to claim 15, wherein said selected two or more recording devices are selected based on said analysis of similarity and on a selection rule that at least depends on said targeted listening impression and relates to said analysis of similarity.

17. The first apparatus according to claim 15, wherein said targeted listening impression is one of a near-end listening impression and a far-end-listening impression.

18. The first apparatus according to claim 15, wherein said targeted listening impression is selected from a set of at least two pre-defined different targeted listening impressions.

19. The first apparatus according to claim 6, wherein at least two at least partially different sets of selected recording devices are determined from a same set of two or more recording devices.

20. A computer program comprising:
a memory comprising a non-transitory computer-readable storage medium including program code for performing the method according to claim 1 when said computer program is executed on a processor.

* * * * *